United States Patent [19]
Rahn et al.

[11] Patent Number: 6,088,149
[45] Date of Patent: Jul. 11, 2000

[54] APPARATUS FOR USE IN RING LASER GYROSCOPES

[75] Inventors: John P. Rahn, West Hills; Leo K. Lam, Calabasas, both of Calif.

[73] Assignee: Litton Systems Inc., Woodland Hills, Calif.

[21] Appl. No.: 08/283,484

[22] Filed: Jul. 29, 1994

[51] Int. Cl.$^7$ ........................................... G02F 1/09
[52] U.S. Cl. .................. 359/281; 359/485; 356/350
[58] Field of Search .......................... 356/350; 359/281, 359/484, 488, 501

[56] References Cited

U.S. PATENT DOCUMENTS

| | | | |
|---|---|---|---|
| 4,284,329 | 8/1981 | Smith et al. ............................ | 359/281 |
| 4,294,509 | 10/1981 | Nagao ..................................... | 359/484 |
| 4,698,816 | 10/1987 | Chun ....................................... | 359/257 |
| 4,960,331 | 10/1990 | Goldman et al. ...................... | 356/350 |
| 4,969,743 | 11/1990 | Cote et al. ............................. | 356/350 |

Primary Examiner—Georgia Epps
Assistant Examiner—Evelyn A. Lester
Attorney, Agent, or Firm—Robert E. Malm

[57] ABSTRACT

The invention is a focusing polarization rotator for use in the resonant mirror system of a ring laser gyroscope. The focusing polarization rotator accomplishes the traditional task of rotating the plane of polarization of a light beam that passes through it and at the same time performs a focusing function on the light rays. In a resonant mirror system, the device acts to constrain the transverse dimensions of light beams that follow the closed light-beam path established by the resonant mirror system thereby obviating the need for one or more curved mirrors that usually perform this function. The focusing polarization rotator is a wedge-shaped lens made from either a magneto-optic transparent material with a magnetic field within the lens or a material having different indices of refraction for left- and right-circularly-polarized light. The wedge shape of the lens greatly improves the bias stability of the RLG in which it is used.

14 Claims, 2 Drawing Sheets

APPARATUS FOR USE IN RING LASER GYROSCOPES

BACKGROUND OF INVENTION

This invention relates generally to ring laser gyroscopes and more particularly, to multioscillator ring laser gyroscopes.

The ring laser gyroscope (RLG), in its simplest form, is a device comprising an arrangement of mirrors for directing light beams around a closed path through a gain region comprising a lasing gas and an arrangement of electrodes for creating an electrical discharge in the gas and a means for measuring the frequency difference of light beams thereby generated that are propagated around the closed path in opposite directions. The frequency difference of the light beams is a measure of the rotational rate of the RLG apparatus in the plane of the light beams.

A serious problem with this two-frequency RLG is that rotational rates near zero are difficult to measure because of lock-in-the coupling of the counter-propagating light beams as a result of backscatter arising from non-ideal optics.

A commercially-successful two-frequency RLG has evolved that circumvents the lock-in problem by separating the frequencies of the counter propagating light beams at zero rotation rate by creating an artificial rotation rate. This artificial rotation rate is brought about by mechanically dithering either the RLG block or a mirror.

The multioscillator RLG represents a more sophisticated approach to solving the lock-in problem by utilizing a purely optical scheme. The scheme is based on the establishment of four resonant modes for the mirror system by placing, for example, a reciprocal polarization rotator and a nonreciprocal polarization rotator in the light path. The lock-in problem is avoided since the four resonant frequencies associated with the four resonant modes are all different, even at a zero rotation rate.

A typical resonant mirror system for a multioscillator RLG is shown in FIG. 1. The four mirrors 1 constrain resonant light beams traveling in opposite directions to light path 3. Circularly-polarized light beams experience reciprocal polarization rotations in reciprocal polarization rotator 5 and non-reciprocal polarization rotations in the Faraday rotator 7. The magnetic field required by the Faraday rotator 7 is provided by permanent magnets 9 with magnetic fields within the magnets having directions as shown by the arrows.

The four resonant modes are CW/LCP, CCW/LCP, CCW/RCP, and CW/RCP, the acronyms CW and CCW standing respectively for clockwise and counterclockwise propagation around the closed path and LCP and RCP standing respectively for left-circularly-polarized light and right-circularly-polarized light. A measure of the rotation rate is obtained by first taking the differences in the frequencies of the right-circularly-polarized light beams and the frequencies of the left-circularly-polarized light beams and then taking the difference in the differences.

A typical example of a reciprocal polarization rotator is a crystalline-quartz element with its optic axis aligned with one portion of the light-beam path. Another way of achieving reciprocal polarization rotation is by using a non-planar light-beam path geometry. The non-reciprocal polarization rotator is typically a Faraday rotator consisting of a thin glass disc in which there is a magnetic field normal to the disc.

Another characteristic of modern RLGs is the use of some means of focusing the light beams so as to minimize the light-beam dimensions transverse to the light path. The usual focusing approach is to utilize a curved mirror for at least one of the mirrors that direct the light beams around the closed path.

BRIEF SUMMARY OF INVENTION

The invention is a focusing polarization rotator for use in the resonant mirror system of a ring laser gyroscope (RLG). The resonant mirror system is an arrangement of mirrors which guide light beams around a closed path in an RLG. A polarization rotator is frequently placed in the light-beam path of a resonant mirror system for the purpose of introducing reciprocal and/or non-reciprocal rotations of the planes of polarization of light beams propagating in opposite directions along the light-beam path. The focusing polarization rotator not only causes rotations of the planes of polarization of light beams but also focuses the light beams so as to constrain the transverse dimensions of the light beams. The beam-constraining function in RLGs is usually performed by one or more curved mirrors. Thus, the need for curved mirrors in the resonant mirror system is obviated by the presence of the focusing polarization rotator.

The focusing polarization rotator is a wedge-shaped lens made from a transparent material. The focusing reciprocal polarization rotator utilizes a material for which the refractive index is different for right- and left-circularly-polarized light. The Faraday type of focusing non-reciprocal polarization rotator utilizes a magneto-optic material with a magnetic field inside the lens. The non-reciprocal rotator is different from the reciprocal rotator only in that the non-reciprocal rotator provides oppositely signed index differences for waves propagating in opposite directions through the rotator. Typically, one surface of the lens is curved to provide focusing while the other surface is planar, although both surfaces could be curved. The wedge shape of the device greatly improves the bias stability of the RLG in which it is used. In operation, the wedge-shaped lens, when used as a Faraday rotator, has a magnetic field within the device and approximately parallel to the axis of the lens.

A portion of the light-beam path in an RLG is in a gain region and the remaining portion is in a non-gain region. Typically, a line connecting a point in the gain-region and a point in the non-gain region exists for which the light-beam path and the gain-region is symmetrical with respect to the line. The focusing Faraday rotator is located near the point of intersection of the line of symmetry and the light-beam path in the non-gain portion of the light-beam path thereby bringing about a highly-desirable symmetry in the counter-propagating light beams with respect to the gain region.

BRIEF DESCRIPTION OF DRAWINGS

FIG. 3 2 shows an edge view of the focusing polarization rotator.

DESCRIPTION OF THE PREFERRED EMBODIMENT

The present invention is a focusing polarization rotator which can be substituted for the conventional polarization rotator of either the reciprocal or non-reciprocal type used in multioscillator RLGs, thereby avoiding the need for beam-focusing curved mirrors.

Figure 2:
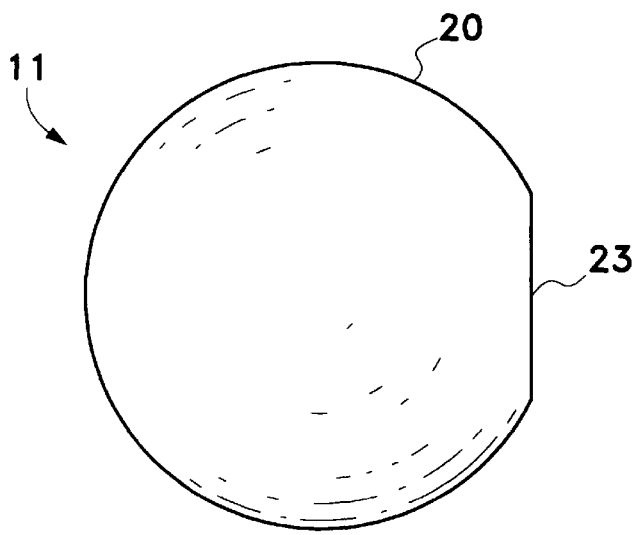
FIG. 2 shows the top view of the focusing polarization rotator.
Figure 3:
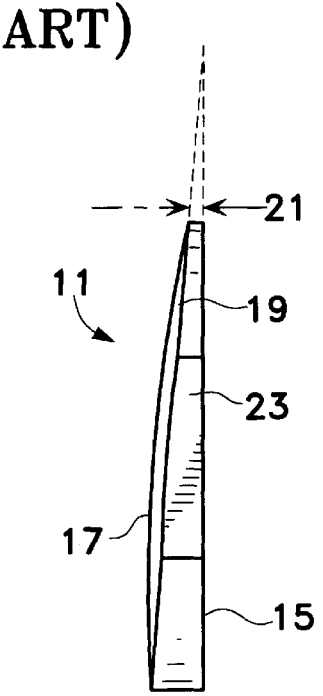
Figure 4:
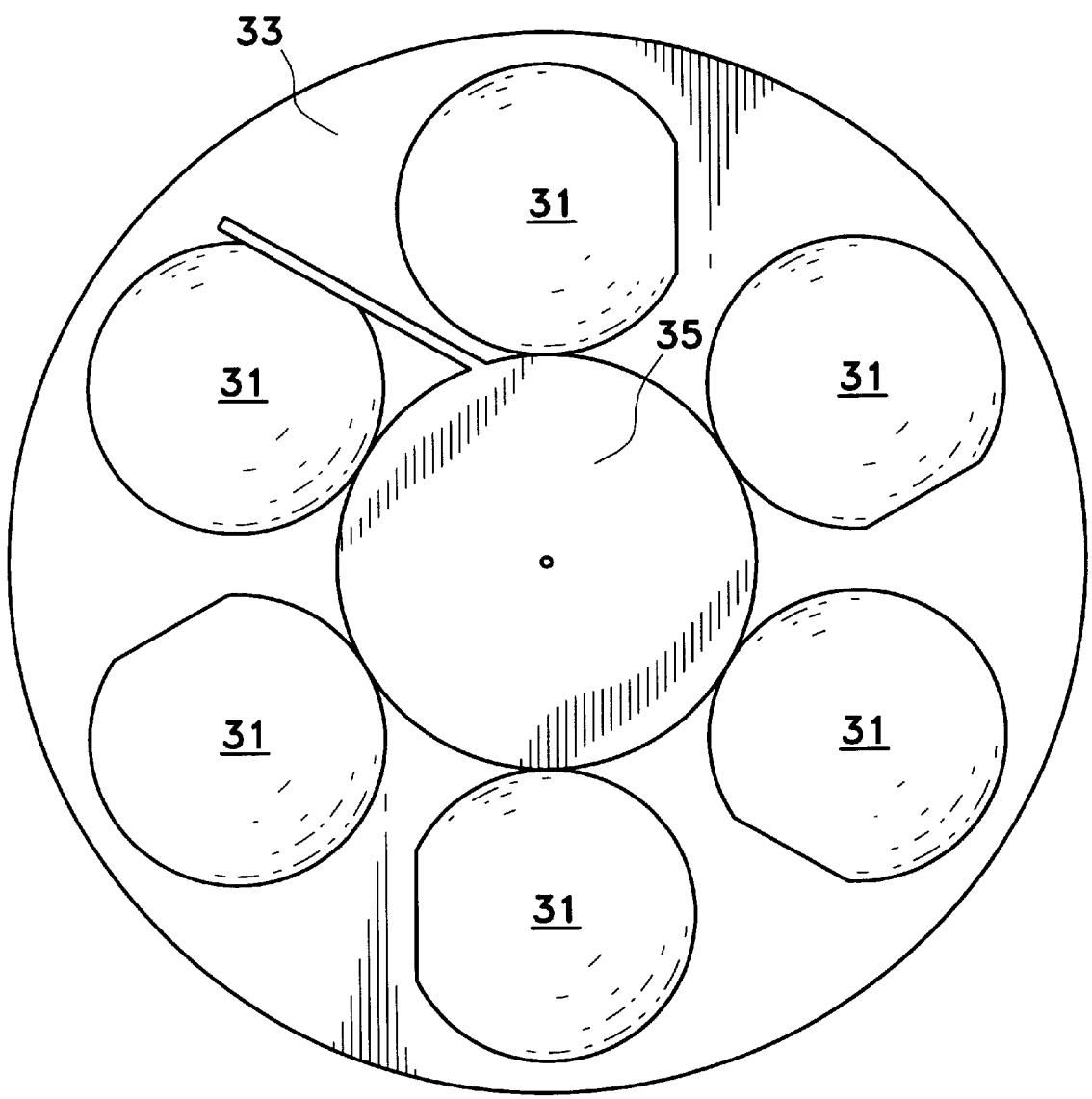
FIG. 4 is a top view of six rough-cut fused-silica discs mounted on a blocking plate preparatory to polishing.

The top and side views of the focusing polarization rotator 11 are shown in FIGS. 2 and 3 respectively. The preferred embodiment of the rotator is a wedge-shaped disc of crystalline quartz for a reciprocal rotator and fused silica for a Faraday non-reciprocal rotator with one surface 15 being flat and the other surface 17 being spherical. The plane 19, defined by the points on the circumference 20 of the spherical surface 17, makes a wedge angle 21 with respect to the flat surface 15 where the wedge angle is the angle between the normal to the spherical surface at its geometric center and the normal to the flat surface 15. The flat mounting surface 23 is normal to the intersection of planes 15 and 19. As the instrument is assembled, the flat mounting surface 23 of the focusing polarization rotator 11, is bonded to the flat end of a rod (not shown) which rod has on its opposing end, a cap for positioning and sealing the rotator. The focusing polarization rotator 11 is then inserted in a receiving aperture in the body of the gyro.

A non-zero wedge angle, though not essential for performing the polarization rotation function, is desirable in RLGs in that it minimizes output-signal bias variations as a function of temperature. For a zero wedge angle, the light transmitted through the rotator without internal reflections combines with the light transmitted through the rotator with internal reflections in fixed phase relationships over the beam diameter. These fixed phase relationships vary with temperature thereby causing variations in the intensity of the light emerging from the rotator and variations in RLG bias.

For a wedge angle of sufficient magnitude, the phase relationships between non-internally-reflected light and internally-reflected light vary over the beam diameter by many wavelengths thereby resulting in an averaging effect on the intensity of the light that emerges from the rotator. As a result, bias variations as a function of temperature are significantly reduced. The magnitude of the wedge angle is not critical, but it must be large enough to provide many fringes of interference between the two surfaces within the area of the actual laser beam. For a beam diameter of about 0.8 millimeters, a wedge angle of about 10 milliradians is appropriate.

The light-beam radius in a ring laser gyroscope is governed by the equation:

$$\omega_o = \left(\frac{\lambda}{\pi n}\right)^{\frac{1}{2}} \left[\frac{(2R-L)L}{4}\right]^{\frac{1}{4}} \quad (1)$$

where $\omega_o$ is the beam radius (defined as the radial distance from the center of the beam to where the intensity of the beam is $1/e^2$ times the intensity at the center), $\lambda$ is the wavelength of the light in vacuum, n is the index of refraction of the light propagating medium, R is the radius of curvature of the focusing mirror, and L is the length of the closed light path.

Figure 1:
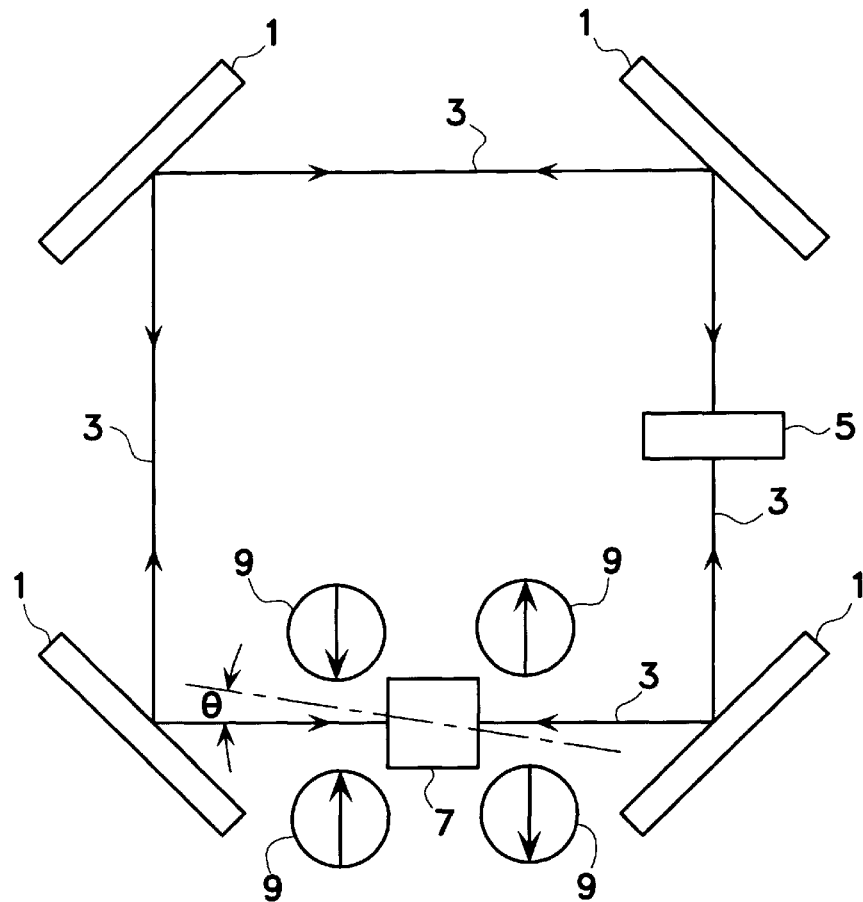
FIG. 1 is a schematic drawing of the resonant mirror system, the reciprocal and non-reciprocal polarization rotators, and magnets for producing a magnetic field in the non-reciprocal polarization rotator for use in a ring laser gyroscope.

For example, a multioscillator RLG with a resonant mirror system like that shown in FIG. 1 might use a single curved mirror with a six-meter radius of curvature R for a path length L of 0.184 meters in a medium having a refractive index of approximately one. For light having a wavelength of 633 nanometers, the beam radius computed from the equation above is 0.386 millimeters.

The ratio of the radii of a mirror and a plano-convex lens having the same focal lengths is equal to 2/(n−1) where n is the refractive index of the lens material. Thus, to produce the same focusing effect as a six-meter mirror, the curved surface of a plano-convex lens made of fused silica (n=1.46) should have a radius of curvature of (1.46−1)/2 times six meters or 1.38 meters.

The diameter of the focusing polarization rotator theoretically need only be slightly larger than the light-beam diameter. However, practical considerations dictate a considerably larger diameter. For example, the diameter of the preferred embodiment is approximately 5.59 millimeters—a number that is about seven times larger than the light-beam diameter.

The rotation of the plane of polarization by the focusing Faraday rotator is governed by the equation $$\phi = VBD \cos \alpha \quad (2)$$

where $\phi$ is the angle of rotation, V is the Verdet constant of the material, B is the magnetic flux density, d is the device length, and $\alpha$ is the angle between the magnetic field and the direction of light beam. The Verdet constant equals 3.78 rad/(T·m) for fused silica and a 633-nm wavelength light beam. The preferred embodiment of the focusing Faraday rotator has a length of 0.003 meters and requires a magnetic flux density of about 0.25 tesla. The substitution of these numbers in equation (2) results in an angle of rotation for a 633-nm-wavelength light beam of 2.8 milliradians. The device length and the magnetic flux density can, of course, be changed to obtain other values for the angle of rotation.

The preferred embodiment of the focusing polarization rotator is disc-shaped with a flat on the edge for mounting in an RLG. The fabrication process begins with the cutting of discs from uniform-thickness crystalline quartz or fused-silica sheets and continues with a series of grinding and polishing operations.

The edges of the rough-cut parts are first beveled so as to avoid chipping during subsequent grinding and polishing operations. An edge flat is then ground and polished on each part. Next, the parts are blocked onto a flat blocking plate. The surface corresponding to surface 15 in FIG. 2 is then flattened on a cast iron grinding surface. The block is then placed on a single-spindle polishing machine and super polished with a flat pitch lap.

The parts are then turned upside down and blocked onto the blocking plate 33 in the arrangement shown in FIG. 3. The parts 31 are arranged in a circle with a center concentric with the center of the blocking plate. The orienting device 35 which pivots around the center of the blocking plate provides the means for establishing the desired radial distance of the parts from the center of the blocking plate and also the means for assuring that the edge flat of a part is parallel to the line from the center of the blocking plate to the center of the part.

After mounting the parts on the blocking plate, the top surfaces of the parts are ground with a concave grinding plate and then polished until the surfaces conform to the shape of a concave pitch lap.

The advantage of this procedure is that the wedge angle can be accurately maintained for all parts if the thickness of the parts around the ring is accurately maintained. Because the grinding force and polishing forces are applied symmetrically, thickness can be accurately maintained without great difficulty.

The advantages of using a focusing polarization rotator rather than a curved mirror in the resonant mirror system of an RLG is first of all, for a resonant mirror system like that shown in FIG. 1 with a focusing Faraday rotator centered in the lower horizontal light path, the light beams are dimensionally symmetrical with respect to a vertical center line midway between right- and left-side mirror pairs. The gain regions, 36 of the RLG can also be arranged to be symmetrical with respect to the same vertical center line thereby promoting stability of RLG bias.

If beam focusing is to be provided by a reciprocal polarization rotator rather than a Faraday rotator, then the focusing reciprocal polarization rotator should be so positioned in the light path as to realize the symmetry advantages described in the previous paragraph.

The same resonant mirror system with a non-focusing polarization rotator and a focusing mirror at the upper left corner of the light path results in the light beams being dimensionally symmetrical with respect to the diagonal line from the upper left corner to the lower right corner of the light path. It is very difficult to arrange the gain regions of the RLG to be symmetrical with respect to this diagonal line, and consequently, with this configuration, a penalty must be paid in RLG bias.

A second advantage of using the focusing polarization rotator rather than a curved mirror in an RLG resonant mirror system is a reduction in astigmatism. A measure of astigmatism is the quantity $(1-\cos\theta)$ where $\theta$ is the angle of incidence of the light beams. The focusing Faraday rotator is typically oriented in the light path so as to have something like a 6-degree angle of incidence $(1-\cos 6° = 0.0055)$ while a mirror in a four-mirror resonant mirror system has a 45-degree angle of incidence $(1-\cos 45° = 0.293)$. The astigmatism is thus something like a factor of 50 lower for the focusing Faraday rotator as compared to a curved mirror. Reduced astigmatism increases the range of values for L/R for which the light-beam size is stable making it possible to choose an L/R value far from the values corresponding to beam-size instability. It is believed that the choice of an L/R value far from the L/R values corresponding to beam-size instability reduces RLG bias variations over time.

A third advantage of the focusing polarization rotator is the reduced radius of curvature as compared to a curved mirror for the same focusing power. Since the accurate fabrication of spherical surfaces of small area becomes increasingly difficult as the radius of curvature increases, the use of a focusing polarization rotator permits the construction of RLGs having larger beam radii than are possible with curved-mirror RLGs. RLGs with larger beam radii are less susceptible to coupling due to backscatter at mirrors or at the polarization rotator and therefore have lower bias errors.

What is claimed is:

1. Apparatus for use in a ring laser gyroscope comprising:
   a lens which causes the plane of polarization of an incident light wave to be rotated in passing through the lens, the lens being a transparent device having at least one curved surface through which the light wave passes;
   three or more mirrors arranged to guide light beams around a closed circumferential light path, the lens being placed in the closed light path.

2. The apparatus of claim 1 wherein
   the lens is made of a magneto-optic transparent material, the apparatus further comprising:
   a magnetic field within the lens and parallel to the lens axis.

3. A method of using the apparatus of claim 2 in a ring laser gyroscope wherein a first portion of the light-beam path is in a gain region and a second portion is in a non-gain region, the method comprising the steps:

installing the lens in the light-beam path near the center of the non-gain region, the angle between the light-beam path and the lens axis being greater than zero degrees;
   providing a source of the magnetic field within the lens.

4. The apparatus of claim 1
   wherein the closed circumferential light path is symmetrical with respect to a line passing through the lens.

5. The apparatus of claim 1 wherein one or more portions of the closed circumferential light path are in gain regions, the light path and the gain regions being symmetrical with respect to a line passing through the lens.

6. The apparatus of claim 1 wherein the lens is wedge shaped.

7. A method of making the lens of claim 6 comprising the steps:
   fabricating a plurality of rough-cut parts, each part having the rough dimensions of the lens;
   beveling the edges of the rough-cut parts;
   grinding and polishing a flat on the edge surface of each part;
   polishing the back surface of each part;
   blocking the polished surface of each part onto a circular flat blocking plate of a polishing machine, each part being equidistant from the center of the blocking plate, the edge flat of each part being parallel to a line from the center of the blocking plate to the center of the part;
   grinding and polishing the plurality of parts with a curved grinding plate.

8. The apparatus of claim 1 wherein the lens has a ground and polished optical flat on the lens edge.

9. The apparatus of claim 1 wherein
   the lens is made of a transparent material having different indices of refraction for left- and right-circularly-polarized light.

10. A method of using the apparatus of claim 9 in a ring laser gyroscope wherein a first portion of the light-beam path is in a gain region and a second portion is in a non-gain region, the method comprising the steps:
    installing the lens in the light-beam path near the center of the non-gain region, the angle between the light-beam path and the lens axis being greater than zero degrees.

11. The apparatus of claim 1 wherein the angle of incidence of the incident light wave is greater than zero degrees.

12. A method of making the lens of claim 11 comprising the steps:
    fabricating a plurality of rough-cut parts, each part having the rough dimensions of the lens;
    beveling the edges of the rough-cut parts;
    grinding and polishing a flat on the edge surface of each part;
    polishing the back surface of each part;
    blocking the polished surface of each part onto a circular flat blocking plate of a polishing machine, each part being equidistant from the center of the blocking plate, the edge flat of each part being parallel to a line from the center of the blocking plate to the center of the part;
    grinding and polishing the plurality of parts with a curved grinding plate.

13. The apparatus of claim 1
    wherein a gain portion of the light path is in a gain region and a non-gain portion of the light path is in a non-gain region, the lens being located near the point of intersection of a line of symmetry and the light path in the non-gain portion of the path, the line of symmetry being a line connecting a point in the gain region and a point in the non-gain region, the light path and the gain region being symmetrical with respect to the line of symmetry.

14. A method of rotating the plane of polarization and constraining the transverse dimensions of a light beam traversing a closed path by operations performed on the light beam in a region defined by a first surface and a second surface, the surfaces being normal to the light-beam path, the method comprising the steps:

rotating the plane of polarization in the region between the first and second surfaces;

focusing the light rays in the light beam near the second surface, further comprising the step:

focusing the light rays in the light beam near the first surface.

* * * * *